Dec. 17, 1940.　　R. S. BUNKER　　2,225,494
TENNIS NET
Filed June 4, 1940
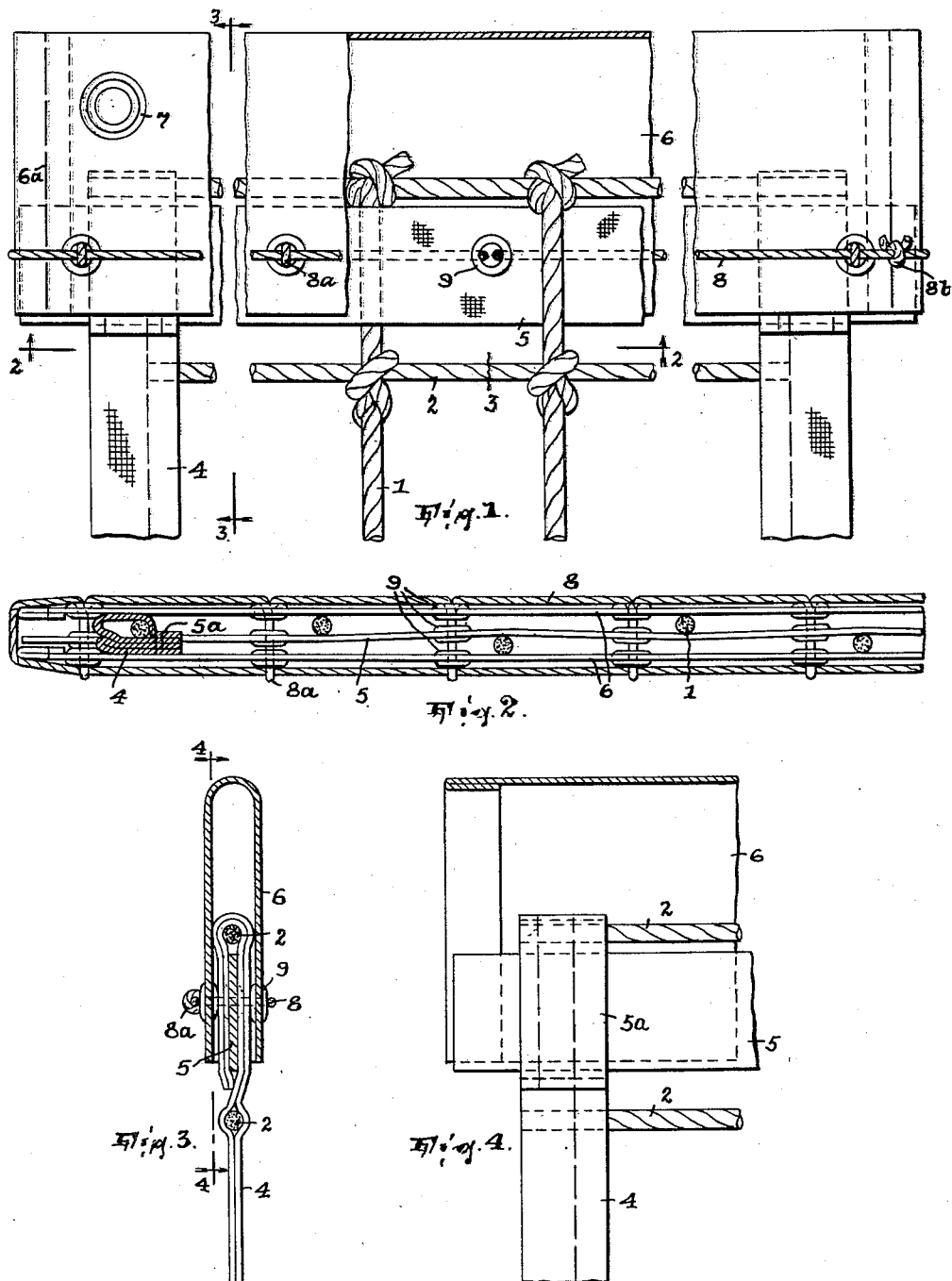
INVENTOR,
Royce S. Bunker,
BY John W. Stewart
ATTORNEY.

Patented Dec. 17, 1940

2,225,494

UNITED STATES PATENT OFFICE 2,225,494

TENNIS NET

Royce S. Bunker, Baltimore, Md., assignor to The Linen Thread Co., Inc., New York, N. Y., a corporation of Delaware Application June 4, 1940, Serial No. 338,711

6 Claims. (Cl. 273—30)

A tennis or the like net usually includes what will be hereinafter termed the net proper and a top-band. The top-band, besides affording visibility, supports the net proper, to wit, by being stitched thereto, the top-band itself being supported by a cable which (the top-band being tubular) is reeved through it. In the act of stitching the net proper to the top-band one or more of the strands of the latter crossed by the stitching line become severed by the stitching needle partially or wholly so that sooner or later the net proper sags at any such point.

According to the present invention stitching is avoided and the net proper is supported directly by a flexible element, as a band, which is threaded in a novel way through the openings of the top row of openings in the net proper. Usually, the part of the net thus formed by such element and the net proper will be supported by the top-band (present both for that purpose and to afford the mentioned visibility at the top of the net) and the necessary connections between such part and the top-band, existing at intervals lengthwise of the latter, are themselves novel in character.

In the drawing:

Fig. 1 is a face view of the upper portion of the improved net, partly broken away and partly in section;

Fig. 2 is a section on line 2—2, and Fig. 3 a section on line 3—3, Fig. 1; and

Fig. 4 is a section on line 4—4, Fig. 3.

The net proper is here shown of usual form or including upright strands 1 and horizontal strands 2 arranged to form openings 3 and knotted together at their crossings, 4 being side bands to which the ends of the horizontal strands are connected, as by stitching. The net proper will, as usual, be tarred.

A horizontal flexible element is here formed by a band 5, which is preferably of duck and also tarred so that it is sufficiently stiff to resist appreciable distortion under the load which it is to carry. This element is threaded horizontally through the topmost row of openings 3 in the net proper, existing in what I term interwoven relation to the upright strands 1 thereof; that is to say, it passes in alternately opposite directions through succeeding openings and so crosses succeeding upright strands alternately at opposite sides thereof. As so related to the net proper it serves directly to support the same. In the present instance said element penetrates each of the total complement of holes in the top row of the net proper.

The top-band is indicated at 6 and here consists of only two plies, being formed by folding a strip of suitable material, as white duck, on a median longitudinal line thereof; before such folding is effected its end edges may be lapped and stitched, as at 6a, in lapped state. It is to contain the cable from which, as usual, the net is suspended. It may have the usual grommets, as 7, through which the ropes are reeved by which the top-band is secured to the cable-supporting posts and drawn taut.

In this example, and as usual, the top-band not only serves, by being white and so distinctive in color from the net proper, to impart visibility to the top of the net but it supports the system formed by the net proper and element 5. For this purpose, receiving said element between its plies, such element is connected to the top-band at horizontal intervals, in the present instance as follows:

A suitable strand 8, as of cord, is extended along one side of the top-band from end to end thereof and at intervals it is formed into loops 8a which are made to penetrate the plies of such top-band and the element 5, preferably in coincidence with each top opening 3 in the net proper. Then said strand is returned or bent around the far end of the top-band and extended along its other side, being made to reach through the mentioned loops. Having been drawn up sufficiently tightly not to cause puckering of the top-band and said element its ends are knotted together, as at 8b. (I might of course use two strands or strand portions, one at one side of the band and having the loops and the other at the other side and penetrating the loops, they being knotted together at each end of the top-band.

Where the strand penetrates the plies, top-band and element 5 the hole required may be afforded in each of these by a grommet 9.

The element 5 may be suitably secured to the upper ends of the side bands 4, as by lapping its ends, as at 5a, and stitching them to the side bands.

Regardless of whether or not the top-band is to constitute a support for the part of the net including the net proper and band 5 the plies of the top-band are desirably to exist connected to the upper margin of such part at intervals, as here to the band 5.

Having thus fully described my invention, what I claim is:

1. A net of the class specified including a net proper composed of crossing strands connected together at their points of crossing and an elongated horizontal flexible supporting element for the net proper threaded through a horizontal row of openings of and adjacent the upper margin of such net proper and substantially from end to end of such row and existing in interwoven relation to the strands between such openings.

2. A net of the class specified including a net proper composed of crossing strands connected together at their points of crossing and an elongated horizontal flexible supporting element for the net proper threaded through a horizontal row of openings of and adjacent the upper margin of such net proper and substantially from end to end of such row and existing in interwoven relation to the strands between such openings, in combination with a horizontally-extending flexible top-band including two adjoining plies containing between them the upper margin of the net proper, and means to connect the top-band to said margin including strand portions having the top-band between them and extending lengthwise thereof and one of which has loops penetrating the plies of the top-band at intervals and the other of which penetrates said loops.

3. A net of the class specified including a net proper composed of crossing upright and horizontal strands connected together at their points of crossing and an elongated horizontal flexible flat supporting band for the net proper threaded through a horizontal row of openings of and adjacent the upper margin of said net proper and existing in interwoven relation to the upright strands between such openings, in combination with a horizontally extending flexible top-band including two adjoining plies containing between them the upper margin of the net proper, and means, extending through the band at points coincident with said openings, to bind each ply to the band against displacement in its own plane relatively to said band at any such point.

4. A net of the class specified including a net proper composed of crossing strands connected together at their points of crossing, an elongated horizontal flexible supporting element for the net proper threaded through a horizontal row of openings of and adjacent the upper margin of such net proper and substantially from end to end of such row and existing in interwoven relation to the strands between such openings, and an elongated horizontal flexible supporting strip of sheet material for said element connected thereto at intervals lengthwise thereof.

5. A net of the class specified including a net proper composed of crossing strands connected together at their points of crossing, an elongated horizontal flexible supporting element for the net proper threaded through a horizontal row of openings of and adjacent the upper margin of such net proper and substantially from end to end of such row and existing in interwoven relation to the strands between such openings and a two-ply elongated horizontal flexible supporting strip of sheet material for said element having the latter arranged between its plies and connected to said strip at intervals lengthwise thereof.

6. The net set forth in claim 1 characterized by said element being a flat stiff band.

ROYCE S. BUNKER.